(12) United States Patent
Li et al.

(10) Patent No.: US 12,414,209 B1
(45) Date of Patent: Sep. 9, 2025

(54) COLOR MIXING CIRCUIT, METHOD AND ELECTRONIC DEVICE FOR LIGHT SOURCES

(71) Applicant: Sundopt LED Lighting Co., Ltd., Shenzhen (CN)

(72) Inventors: Guoxin Li, Shenzhen (CN); Weiyue Yu, Shenzhen (CN)

(73) Assignee: Sundopt LED Lighting Co., Ltd., Shenzhen (CN)

( * ) Notice: Subject to any disclaimer, the term of this patent is extended or adjusted under 35 U.S.C. 154(b) by 0 days.

(21) Appl. No.: 19/015,475

(22) Filed: Jan. 9, 2025

(30) Foreign Application Priority Data

Jul. 4, 2024 (CN) .......................... 202410889340.8

(51) Int. Cl.
| | |
|---|---|
| *H05B 45/20* | (2020.01) |
| *H05B 45/10* | (2020.01) |
| *H05B 47/11* | (2020.01) |
| *H05B 47/155* | (2020.01) |

(52) U.S. Cl.
CPC ............ *H05B 45/20* (2020.01); *H05B 45/10* (2020.01); *H05B 47/11* (2020.01); *H05B 47/155* (2020.01)

(58) Field of Classification Search
CPC ........ H05B 45/10; H05B 45/20; H05B 47/11; H05B 47/155
See application file for complete search history.

(56) References Cited

U.S. PATENT DOCUMENTS

| | | | | |
|---|---|---|---|---|
| 2023/0010921 A1* | 1/2023 | Wu | ........... | H05B 45/325 |
| 2023/0284352 A1* | 9/2023 | Xu | ........... | H05B 45/10 |
| | | | | 315/291 |

FOREIGN PATENT DOCUMENTS

| | | | | |
|---|---|---|---|---|
| CN | 114828327 A | * | 7/2022 | ............ H05B 45/20 |
| CN | 217389049 U | | 9/2022 | |
| CN | 218954759 U | | 5/2023 | |
| JP | 2012043729 A | | 3/2012 | |

* cited by examiner

*Primary Examiner* — Raymond R Chai
(74) *Attorney, Agent, or Firm* — Hawaii Patent Services; Nathaniel K. Fedde; Kenton N. Fedde

(57) ABSTRACT

A color mixing circuit for light sources comprising a power supply module, a first light source module, a second light source module, a first resistance module, a second resistance module, and a circuit gating module; the first light source module is respectively connected to the power supply module and the circuit gating module; the first light source module is further connected to the circuit gating module through the first resistance module; the second light source module is respectively connected with the power supply module and the circuit gating module; the second light source module is further connected to the circuit gating module through the second resistance module; the circuit gating module is also connected to the power supply module; the first light source module and the second light source module are configured to emit light.

6 Claims, 4 Drawing Sheets

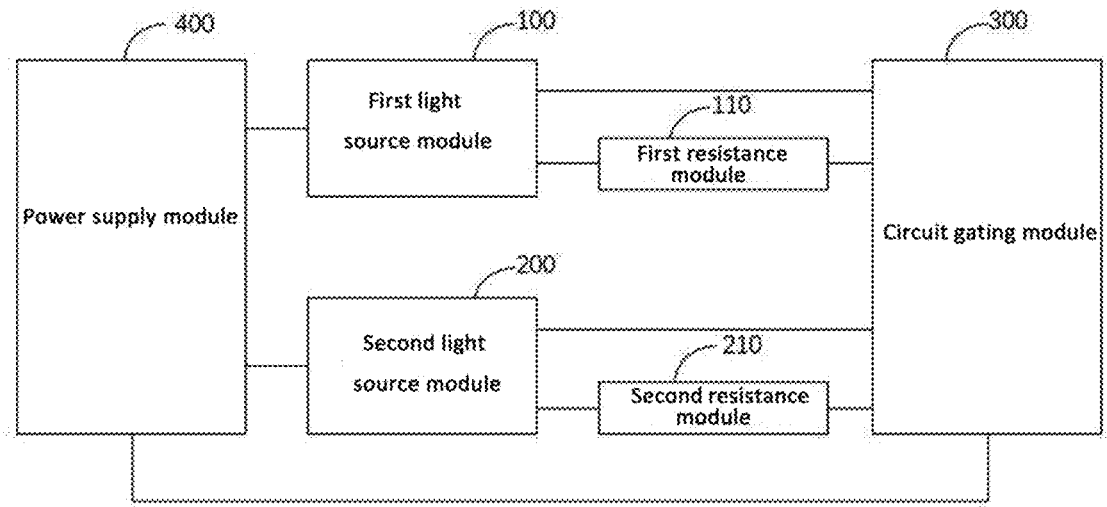

Figure 1

| On-off states | On-off state of the first resistance module | On-off state of the resistance module |
|---|---|---|
| First on-off state | Powered on | Powered off |
| Second on-off state | Powered off | Powered off |
| Third on-off state | Powered off | Powered on |

Figure 2

| On-off states | On-off state of the first resistance module | On-off state of the resistance module |
|---|---|---|
| First on-off state | Powered on | Powered off |
| Second on-off state | Powered off | Powered off |
| Third on-off state | Powered off | Powered on |
| Fourth on-off state | Powered on | Powered on |

Figure 3

COLOR MIXING CIRCUIT, METHOD AND ELECTRONIC DEVICE FOR LIGHT SOURCES

INCORPORATION BY REFERENCE

This application claims the benefit of priority from China Patent Application No. 202410889340.8 filed on Jul. 4, 2024, the contents of which are hereby incorporated by reference in their entirety.

TECHNICAL FIELD

The present invention relates to the field of light source technology, in particular, to a color mixing circuit, method and electronic device for light sources.

BACKGROUND TECHNOLOGY

With improvements of a quality of life, consumers have higher and higher requirements for various types for light sources such as lamps and lanterns, and one of the obvious demands is that light sources should be able to emit light with different color temperatures under different scenarios.

If manufacturers need to manufacture a variety for light sources with different color temperatures for each product, this will result in an increase in the light source model and greater cost investment and inventory pressures, so now most manufacturers will use a color mixing method in light sources to achieve a variety of color temperature adjustment.

Existing color mixing methods for light sources generally adopt a same number of two lamp beads with different color temperatures (such as 3000K and 4000K) for color mixing, with a specific structure as follows: using an equal number of lamp beads, PCB boards, three-position dip switch, power supplies and other components. The lamp beads with 3000K and 4000K color temperatures are mixed and pasted on the PCB board to form a light source assembly, and three color temperatures are realized by adjusting on/off of the two lamp beads through the three-position dip switch. When the three-position dip switch is in a first position, only the 3000K lamp bead is illuminated to obtain light with a 3000K color temperature; when the three-position dip switch is in a second position, only the 4000K lamp bead is illuminated to obtain light with a 4000K color temperature; when the three-position dip switch is in the third position, the 3000K lamp beads and the 4000K lamp beads are illuminated simultaneously, forming a 3500K color temperature by a mixing color. A defect of the existing color mixing method is that there is an equal number of 3000K and 4000K lamp beads, but when the lamp bead with the 3000K color temperature is lit, the lamp bead with the 4000K color temperature will not be lit; when the lamp bead with the 4000K color temperature is lit, the lamp bead with the 3000K color temperature will not be lit. In this way, half of the lamp beads will be wasted, resulting in low light source utilization, low light efficiency and high cost. Meanwhile, unlit lamp beads make the whole lamp look like there is a large dark area. Since there are many unlit lamp beads, it seems that there is a large dark area in the whole lamp.

SUMMARY OF THE INVENTION

In view of this, embodiments of the present invention provide a color mixing circuit, method and electronic device for light sources for solving a problem of dark areas and low utilization rate for light sources when mixing colors in the prior art.

According to a first aspect of the present invention, an embodiment of the present invention provides a color mixing circuit for light sources, wherein the color mixing circuit for light sources comprises a power supply module, a first light source module, a second light source module, a first resistance module, a second resistance module, and a circuit gating module; the first light source module is connected to the power supply module and the circuit gating module, respectively; the first light source module is further connected to the circuit gating module via the first resistance module; the second light source module is connected to the power supply module and the circuit gating module respectively; the second light source module is further connected to the circuit gating module via the second resistance module; the circuit gating module is further connected to the power supply module; the first light source module and the second light source module are used for emitting light, with a color temperature value of the first light source module greater than the color temperature value of the second light source module; the first resistance module and the second resistance module are configured to adjust circuit resistance; the circuit gating module is configured to control on-off states of the first resistance module and the second resistance module.

Preferably, the power supply module comprises a power supply, the first light source module comprises a first light source, the second light source module comprises a second light source, the first resistance module comprises a first resistor, the second resistance module comprises a second resistor, and the circuit gating module comprises the three-position dip switch; an input terminal of the first light source is connected to a positive pole of a power supply, an output terminal of the first light source is connected to a third pin, a fourth pin and a fifth pin of the three-position dip switch, with the first resistor connected in series between the fourth pin and the output terminal of the first light source; the input terminal of the second light source is connected to the positive pole of the power supply, the output terminal of the second light source is connected to a first pin, a seventh pin and an eighth pin of the three-position dip switch, with the second resistor connected in series between the first pin and the output terminal of the second light source; a second pin and a sixth pin of the three-position dip switch are connected with a negative pole of the power supply.

Preferably, the on-off states of the first resistance module and the second resistance module comprise a first on-off state, a second on-off state, a third on-off state, and a fourth on-off state; in the first on-off state, the first resistance module is powered on and the second resistance module is powered off; in the second on-off state, both the first resistance module and the second resistance module are powered off; in the third on-off state, the first resistance module is powered off and the second resistance module is powered on.

Preferably, the on-off states of the first resistance module and the second resistance module comprise the fourth on-off state, in the fourth on-off state, both the first resistance module and the second resistance module are powered on, with the first resistance module and the second resistance module configured to sense strength of external light in order to adjust resistance values of the first resistance module and the second resistance module.

According to a second aspect of the present invention, an embodiment of the present invention further provides a color mixing method for light sources, which is used in the color mixing circuit for light sources described in the first aspect, the method comprising:

obtaining a target color temperature based on the on-off states of the first resistance module and the second resistance module, with different on-off states corresponding to different target color temperatures;

setting the resistance values of the first resistance module and/or the second resistance module based on the target color temperature and ambient illumination parameters; and adjusting a color temperature of the first light source module and/or the second light source module to mix colors to obtain the target color temperature.

Preferably, the ambient illumination parameters comprise: an ambient light intensity and an ambient light color temperature, the step of setting the resistance values of the first resistance module and/or the second resistance module based on the target color temperature and ambient illumination parameters comprising:

normalizing and weighting the ambient light intensity and the ambient light color temperature to obtain an influence degree of the ambient illumination parameters on the target color temperature;

setting the resistance values of the first resistance module and the second resistance module as default resistance values when the influence degree is less than or equal to a preset influence degree; and obtaining an actual color temperature based on the ambient light intensity, the ambient light color temperature and the target color temperature when the influence degree is greater than the preset influence degree;

Preferably, the step of determining the resistance values of the first resistance module and/or the second resistance module based on the actual color temperature comprises:

when in the first on-off state, judging whether the first light source module and the second light source module can mix colors to obtain the actual color temperature based on an initial color temperature of the first light source module and a resistance range of the first resistance module;

if the first light source module and the second light source module can mix colors to obtain the actual color temperature, determining a first target color temperature of the first light source module based on the actual color temperature and the initial color temperature of the second light source module;

determining the resistance values of the first resistance module based on the first target color temperature and the resistance range of the first resistance module;

when in the third on-off state, judging whether the first light source module and the second light source module can mix colors to obtain the actual color temperature based on the initial color temperature of the first light source module and the resistance range of the first resistance module;

if the first light source module and the second light source module can mix colors to obtain the actual color temperature, determining a second target color temperature of the second light source module based on the actual color temperature and the initial color temperature of the first light source module;

determining the resistance values of the second resistance module based on the second target color temperature and the resistance range of the second resistance module;

when in the first on-off state or the third on-off state and the first light source module and the second light source module cannot mix colors to obtain the actual color temperature, switching the on-off state to the fourth on-off state; and determining the resistance values of the first resistance module and the resistance values of the second resistance module based on the initial color temperature of the first light source module and the second light source module, the actual color temperature, and the resistance range of the first resistance module and the second resistance module.

Preferably, the step of determining the resistance values of the first resistance module and the resistance values of the second resistance module based on the initial color temperature of the first light source module and the second light source module, the actual color temperature, and the resistance range of the first resistance module and the second resistance module comprises:

obtaining a first color temperature adjustment range and a second color temperature adjustment range of the first light source module and the second light source module respectively based on the initial color temperature of the first light source module and the second light source module and the resistance range of the first resistance module and the second resistance module;

obtaining a plurality of mixed color temperature combinations based on the first color temperature adjustment range, the second color temperature adjustment range, and the actual color temperature, wherein the mixed color temperature combinations comprise a first color temperature value of the first light source module and a second color temperature value of the second light source module, and the first color temperature value and/or the second color temperature value of each of the mixed color temperature combinations are different;

obtaining resistance combinations corresponding to each of the mixed color temperature combinations, wherein the resistance combinations comprise a first resistance value of the first resistance module and a second resistance value of the second resistance module;

obtaining a color temperature similarity index of each of the resistance combinations according to the mixed color temperature combinations corresponding to each of the resistance combinations and the actual color temperature;

obtaining current combinations corresponding to each of the resistance combinations based on voltage values output by the power supply module to the first light source module and the second light source module, wherein the current combinations comprise a first current value of the first light source module and a second current value of the second light source module;

obtaining an output balance index of a corresponding resistance combination based on the current combinations;

obtaining a power consumption index and a temperature index of each of the resistance combinations based on the current combinations and the corresponding resistance combination;

screening the resistance combinations based on the color temperature similarity index, the output balance index, the power consumption index and the temperature index of each of the resistance combinations to obtain at least one target resistance combination; and determining the resistance values of the first resistance module and the second resistance module based on the target resistance combination.

Preferably, the step of determining the resistance values of the first resistance module and the resistance values of the second resistance module based on the initial color temperature of the first light source module and the second light source module, the actual color temperature, and the resistance range of the first resistance module and the second resistance module comprises:

obtaining accumulated usage duration of the first light source module and the second light source module;

obtaining a first luminous intensity attenuation amount of the first light source module and a second luminous intensity attenuation amount of the second light source module based on luminous intensity attenuation curves of the first light source module and the second light source module and the accumulated usage duration;

when the first luminous intensity attenuation amount is greater than a first preset threshold value, or the second luminous intensity attenuation amount is greater than a second preset threshold value, or a sum of the first luminous intensity attenuation amount and the second luminous intensity attenuation amount multiplied by a preset attenuation coefficient is greater than a third preset threshold value, determining a resistance adjustment amount of the first resistance module and/or the second resistance module based on the first luminous intensity attenuation amount and the second luminous intensity attenuation amount, wherein the third preset threshold value is greater than the first preset threshold value and the second preset threshold value, and the preset attenuation coefficient is between 0.5 and 1.5; and adjusting the color temperature of the first light source module and/or the second light source module based on the resistance value of the first resistance module and/or the second resistance module and the resistance value adjustment amount to obtain the target color temperature by color mixing.

According to a third aspect of the present invention, an embodiment of the present invention provides an electronic device comprising: a color mixing apparatus for light sources comprising the color mixing circuit for light sources according to the first aspect, or the color mixing apparatus for light sources adopts the color mixing method for light sources according to the second aspect.

In summary, in the present invention, the on-off states of the first resistance module are controlled by the circuit gating module, so that the first resistance module plays a current limiting role in the entire circuit, or makes the first resistance module in a powered-off state, and the circuit gating module also controls the on-off states of the second resistance module, so that the second resistance module plays the current limiting role in the entire circuit, or makes the second resistance module in the powered-off state. When the first resistance module plays the current limiting role, the luminous intensity of the first light source module is changed. Similarly, when the second resistance module plays the current limiting role, the luminous intensity of the second light source module is changed. If the luminous intensity of the first light source module is weakened greater than that of the second light source module, the color temperature of an entire light source will decrease. On the contrary, if the luminous intensity of the first light source module is weakened less than that of the second light source module, the color temperature of the entire light source will increase. During an entire color mixing process, the first light source module and the second light source module always maintain a light-emitting state, so there is no dark area and the light source utilization rate is significantly higher than that of the existing technology.

BRIEF DESCRIPTION OF THE DRAWINGS

The technical solution provided by embodiments of the present invention will be clearly and completely understood from the following brief description by reference to the drawings. For those skilled in the art, other drawings can be obtained according to these drawings without making creative labor, and these are all within the scope of protection of the present invention.

FIG. 1 is a schematic diagram of a color mixing circuit for light sources according to an embodiment of the present invention;

FIG. 2 is an on-off state table according to an embodiment of the present invention;

FIG. 3 is another on-off state table according to an embodiment of the present invention;

SPECIFIC EMBODIMENTS

Figure 4:
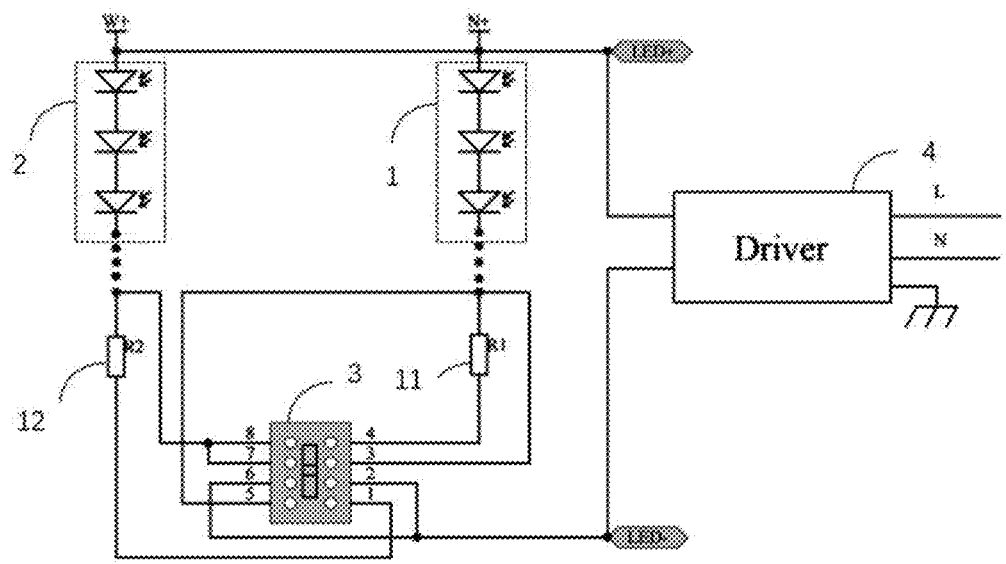
FIG. 4 is a schematic structural diagram of the color mixing circuit for light sources according to an embodiment of the present invention.

The features and exemplary embodiments of various aspects of the present invention will be more clearly understood from the following detailed description taken in conjunction with the accompanying drawings and embodiments. The present invention will be described in further detail below with reference to the accompanying drawings and examples. It is to be understood that the specific embodiments described herein are merely configured to illustrate the present invention and is in no way intended to limit the technical solutions of the present invention. It will be apparent to those skilled in the art that the present invention may be practiced without the need for some of these specific details. The following description of embodiments is merely for the purpose of providing a better understanding of the present invention by illustrating examples of the present invention.

It should be noted that, herein, relational terms such as first and second are used merely to distinguish one entity or operation from another entity or operation, and do not necessarily require or imply that any such actual relationship or order exists between entities or operations. Moreover, terms "comprise/comprises/comprising," "include/includes/including," or any other variation thereof are intended to encompass a non-exclusive inclusion such that a process, method, article, or apparatus that includes a series of elements comprises not only those elements, but also other elements that are not explicitly listed, or elements inherent to such a process, method, article, or apparatus. Without further limitation, an element defined by the statement "comprise/comprises/comprising" does not preclude the presence of additional identical elements in a process, method, article, or apparatus that includes the element. The embodiments described below are merely schematic, and the division of modules or circuits is only a logic function division, and there may be other division methods in actual implementation.

Embodiment 1

Referring to FIG. 1, a schematic diagram of a color mixing circuit for light sources according to an embodiment of the present invention is provided. The color mixing circuit for light sources comprises a power supply module 400, a first light source module 100, a second light source module 200, a first resistance module 110, a second resistance module 210, and a circuit gating module 300.

The first light source module is connected to the power supply module 400 and the circuit gating module 300, respectively; the first light source module 100 is further connected to the circuit gating module 300 via the first resistance module 110; the second light source module 200 is connected to the power supply module 400 and the circuit gating module 300 respectively; the second light source module 200 is further connected to the circuit gating module 300 via the second resistance module 210.

The circuit gating module 300 is further connected to the power supply module 400.

The first light source module 100 and the second light source module 200 are used for emitting light, and various types for light sources may be used, such as LED lamp beads or LED lamp bead assemblies. The color temperature of the first light source module 100 is greater than that of the second light source module 200.

The first resistance module 110 and the second resistance module 210 are used for adjusting resistance values of a circuit, and may adopt a resistor, such as a fixed resistance resistor, or a variable resistance resistor, such as a sliding rheostat, a photoresistor, etc.

The power module 400 is used to provide a drive circuit, and a constant current power supply may be used. The circuit gating module 300 is used to control on-off states of the first resistance module 110 and the second resistance module 210, and may adopt a dip switch or a multiplexer.

In the present invention, the on-off states of the first resistance module 110 are controlled by the circuit gating module 300, so that the first resistance module 110 plays the current limiting role or is powered off in an entire circuit. The circuit gating module 300 also controls the on-off states of the second resistance module 210 so that the second resistance module 210 plays the current limiting role or is powered off in the entire circuit.

Referring to FIG. 2, an on-off state table according to an embodiment of the present invention is provided.

Specifically, the on-off states of the first resistance module 110 and the second resistance module 210 comprise a first on-off state, a second on-off state, and a third on-off state. When the circuit gating module 300 controls the on-off states of the first resistance module 110 and the second resistance module 210 to be the first on-off state, the on-off state of the first resistance module 110 is powered on, that is, the first resistance module 110 plays the current limiting role; The second resistance module 210 is under the powered-off state, that is, the second resistance module 210 does not function as a current limiting. When the circuit gating module 300 controls the on-off states of the first resistance module 110 and the second resistance module 210 to be the second on-off state, the first resistance module 110 is under the powered-off state, and the second resistance module 210 is an open circuit. When the circuit gating module 300 controls the on-off states of the first resistance module 110 and the second resistance module 210 to be the third on-off state, the first resistance module 110 is powered off, and the on-off state of the second resistance module 210 is powered on.

In an embodiment of the present invention, a total of three on-off states are provided. When in the first on-off state, the first resistance module is powered on and the second resistance module is powered off. In this state, the first resistance module can play the current limiting role, so that the luminous intensity of the first light source module can be changed, and a first color temperature can be obtained by color mixing with the second light source module. In the second on-off state, a luminous intensity of the first light source module and the second light source module cannot be adjusted, and at this time, a second color temperature is obtained by color mixing. In the third on-off state, the second resistance module can play the current limiting role, so that the luminous intensity of the second light source module can be changed, and a third color temperature can be obtained by color mixing with the first light source module. Therefore, at least three color temperatures can be obtained by color mixing according to an embodiment of the present invention.

When the first resistance module 110 is switched from a powered-off state to a powered-on state, that is, when the first resistance module 110 plays the current limiting role, the luminous intensity of the first light source module 100 is changed. Similarly, when the second resistance module 210 is switched from the powered-off state to the powered-on state, that is, when the second resistance module 210 plays the current limiting role, the luminous intensity of the second light source module is changed. Similarly, when the second resistance module 210 is switched from the powered-off state to the powered-on state, that is, when the second resistance module 210 plays the current limiting role, the luminous intensity of the second light source module is changed. On the contrary, if a degree of weakening of the luminous intensity of the first light source module 100 is less than that of the second light source module 200, an overall color temperature of an entire light source will increase. During a whole color mixing process, the first light source module 100 and the second light source module 200 always maintain a light emitting state, so there is no dark area, with a utilization rate of the light source significantly higher than that of the prior art.

Referring to FIG. 3, another on-off state table according to an embodiment of the present invention is provided.

In addition to the first on-off state, the second on-off state, and the third on-off state described in detail above, a fourth on-off state is provided. When the circuit gating module 300 controls the on-off state of the first resistance module 110 and the second resistance module 210 to be the fourth on-off state, the first resistance module 110 is powered on, and the second resistance module 210 is powered on, that is, both the first resistance module 110 and the second resistance module 210 can play the current limiting role. Therefore, the luminous intensity of the first light source module 100 and the second light source module 200 can be changed to perform color mixing. More specifically, different embodiments may be employed. For example, by making the luminous intensity of the first light source module 100 and the second light source module 200 change in a same degree, an overall luminous intensity of the light source can be changed without changing the overall color temperature, and more diversified usage scenarios can be provided for users, thereby being suitable for different environments and meeting different needs. In another embodiment, the first resistance module 110 and the second resistance module 210 having different resistance values may also be provided, and at this time, another color temperature may be obtained by color mixing. The first resistance module and the second resistance module with adjustable resistance values can also be adopted, so as to maximize freedom of color mixing.

Referring to FIG. 4, a schematic structural diagram of the color mixing circuit for light sources according to an embodiment of the present invention is provided.

In the present embodiment, the power supply module comprises a power supply 4, the first light source module comprises a first light source 1, the second light source module comprises a second light source 2, the first resistance module comprises a first resistor 11, the second resistance module comprises a second resistor 12, and the circuit gating module comprises a three-position dip switch 3.

An input terminal of the first light source 1 is connected to a positive pole of the power supply 4, an output terminal of the first light source 1 is connected to a third pin, a fourth pin and a fifth pin of the three-position dip switch 3, with the first resistor 11 connected in series between the fourth pin and the output terminal of the first light source 1. The input terminal of the second light source 2 is connected to the positive pole of the power supply 4, the output terminal of the second light source 2 is connected to a first pin, a seventh pin and an eighth pin of the three-position dip switch 3, with the second resistor 12 connected in series between the first pin and the output terminal of the second light source 2. A second pin and a sixth pin of the three-position dip switch 3 are connected with a negative pole of the power supply 4.

According to an embodiment of the present invention, the circuit gating module comprises the three-position dip switch 3, and a user can set the three-position dip switch 3 in different positions, which has strong practicability and high reliability. When the three-position dip switch 3 is turned to a first position, the first pin is connected to the second pin, and the fifth pin is connected to the sixth pin. At this time, currents pass through the second light source 2 and the second resistor 12, and then return to the negative pole of the power supply 4, and return to the negative pole of the power supply 4 through the first light source 1. The second resistor 12 plays the current limiting role simultaneously, with the luminous intensity of the second light source 2 reduced, and the first color temperature obtained by mixing with the first light source 1. When the three-position dip switch 3 is turned to a second position, the third pin is connected to the second pin, and the seventh pin is connected to the sixth pin. At this time, the currents return to the negative pole of the power supply 4 through the first light source 1 and the second light source 2 respectively. The first resistor 11 and the second resistor 12 do not play the current limiting role. The luminous intensity of the first light source 1 and the second light source 2 remains unchanged, and the second color temperature is obtained by mixing color. When the three-position dip switch 3 is turned to the third position, the fourth pin is connected to the second pin, and the eighth pin is connected to the sixth pin of the three-position dip switch 3. At this time, the current pass through the first light source 1 and the first resistor 11, and then return to the negative pole of the power supply 4, and passe through the second light source 2 and return to the negative pole of the power supply 4. The first resistor 11 plays the current limiting role simultaneously, with the luminous intensity of the first light source 1 reduced, and the third color temperature is obtained through color mixing with the second light source 2. Obviously, the color temperature is a highest in the first position, followed by the second position, and a lowest in the third position.

In a preferred embodiment of the present invention, the color temperature of the first light source module is 5000K, and the color temperature of the second light source module is 2700K. In this color temperature combination, three commonly used color temperatures of 3000K, 3500K and 4000K can be obtained easily by color mixing.

Figure 5:
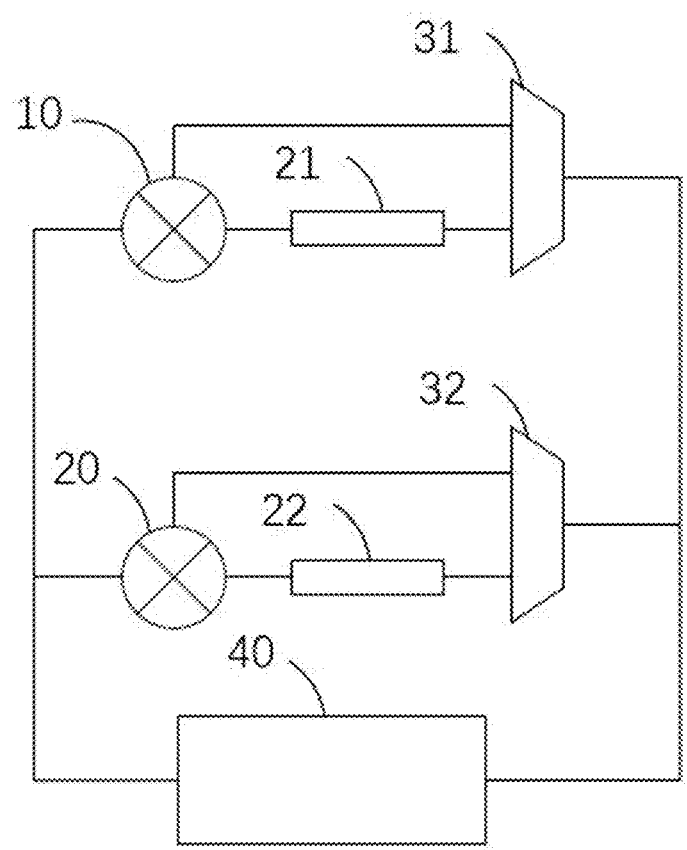
FIG. 5 is a schematic structural diagram of another color mixing circuit for light sources according to an embodiment of the present invention.

Referring to FIG. 5, a schematic structural diagram of another color mixing circuit for light sources according to an embodiment of the present invention is provided.

The power supply module comprises the power supply 40, the first light source module comprises a first light source 10, the second light source module comprises a second light source 20, the first resistance module comprises the first resistor 21, the second resistance module comprises the second resistor 22, and the circuit gating module comprises a first multiplexer 31 and a second multiplexer 32; the input terminal of the first light source 10 is connected to the positive pole of the power supply 40, the output terminal of the first light source 10 is connected to a first input terminal and a second input terminal of the first multiplexer 31, and the first resistor 21 is further connected in series between the second input terminal of the first multiplexer 31 and the output terminal of the first light source 10; The input terminal of the second light source 20 is connected to the positive pole of the power supply 40, the output terminal of the second light source 20 is connected to the first input terminal and the second input terminal of the second multiplexer 32, and the second resistor 22 is connected in series between the second input terminal of the second multiplexer 32 and the output terminal of the second light source 20; the output terminal of the first multiplexer 31 and the second multiplexer 32 is connected to the negative pole of the power supply 40.

According to other embodiments of the present invention, other multiplexers such as 1 out of 4, 1 out of 8, 1 out of 16, etc. may be selected. The present invention does not specifically limit a number of input terminals of the multiplexer, and the number of input terminals of the first multiplexer 31 and the second multiplexer 32 may be the same or different.

When a n out of 1 multiplexer (n is an integer greater than or equal to 2) is used, except that the first input terminal is directly connected to the light source, other input terminals are connected in series with a resistor with variable resistance values and then connected to the light source, so that color mixing of more positions can be realized.

According to an embodiment of the present invention, an A-out-of-1 multiplexer is selected as the first multiplexer 31, and a B-out-of-1 multiplexer is selected as the second multiplexer 32, wherein at least one of A and B is an integer greater than 2. The input terminal of the first light source 10 is connected to the positive pole of the power supply 40, the output terminal of the first light source 10 is connected to A input terminals of the first multiplexer 31, and a resistor is respectively connected in series between the second input terminal to an A-th input terminal of the first multiplexer 31 and the output terminal of the first light source 10; The input terminal of the second light source 20 is connected to the positive pole of the power supply 40, the output terminal of the second light source 20 is connected to B input terminals of the second multiplexer 32, and the resistor is respectively connected in series between the second input terminal to a B-th input terminal of the second multiplexer 32 and the output terminal of the second light source 20. The output terminal of the first multiplexer 31 and the second multiplexer 32 is connected to the negative pole of the power supply 40. More specifically, the resistance values of resistors connected in series between the second input terminal and the A-th input terminal of the first multiplexer 31 are different. The resistance values of the resistors connected in series between the second input terminal and the B-th input terminal of the second multiplexer 32 are different. Obviously, at this time, A*B color temperatures can be obtained by color mixing.

Further, according to an embodiment of the present invention, the resistor connected in series to the input terminal of the first multiplexer 31 and the second multiplexer 32 is the resistor with variable resistance values. At this time, a fixed color temperature can not only be obtained by color mixing, but also can be adjusted more flexibly based on different requirements of users.

According to an embodiment of the present invention, the first multiplexer 31 and the second multiplexer 32 are configured to control the on-off states of the first resistor 21 and the second resistor 22. An input selection of the multiplexer may be achieved using a control signal. Specifically, when the control signal of the first multiplexer 31 is at a low level, the first input terminal thereof is turned on and the second input terminal is turned off. When the control signal of the first multiplexer 31 is high, the first input terminal of the first multiplexer 31 is turned off and the second input terminal is turned on. When the control signal of the second multiplexer 32 is low, the first input terminal thereof is turned on and the second input terminal is turned off; when the control signal of the second multiplexer 32 is high, the first input terminal of the second multiplexer 32 is turned off and the second input terminal is turned on. Therefore, a control of the on-off states of the first resistor 21 and the second resistor 22 can be realized by controlling high and low levels of the control signal.

According to an embodiment of the present invention, a voice password may be set to generate the control signal. For example, when the user uses the voice password "turn on the first position", a first control signal is generated to cause the first multiplexer 31 to connect the first input terminal, and a second control signal is generated to cause the second multiplexer 32 to connect the second input terminal. At this time, the second resistor 22 plays the current limiting role, and the luminous intensity of the second light source 20 decreases, and a color temperature of the first position is formed by color mixing with the first light source 10. When the user uses the voice password "turn on the second position", the first control signal is generated to cause the first multiplexer 31 to connect the first input terminal, and a second control signal is generated to cause the second multiplexer 32 to connect the first input terminal. At this time, both the first resistor 21 and the second resistor 22 are powered off, the luminous intensity of the first light source 10 and the second light source 20 remains unchanged, and a color temperature of the second position is obtained by color mixing. When the user uses the voice password "turn on the third position", the first control signal is generated to cause the first multiplexer 31 to connect the second input terminal, and the second control signal is generated to cause the second multiplexer 32 to connect the first input terminal. At this time, the first resistor 21 plays the current limiting role, the second resistor 22 is turned off, the luminous intensity of the first light source 10 decreases, and a color temperature of the third position is obtained by color mixing with the second light source 20. It is also possible to set the voice password "turn on the fourth position", the first control signal is generated to allow the first multiplexer 31 to connect the second input terminal, and the second control signal is generated to allow the second multiplexer 32 to connect the second input terminal, at which time both the first resistor 21 and the second resistor 22 play the current limiting role. At this time, a change of the overall color temperature is determined by specific resistance values of the first resistor 21 and the second resistor 22.

According to an embodiment of the present invention, the first resistance module and the second resistance module adopt the photoresistor, with the first resistance module and the second resistance module used for sensing an intensity of external light to adjust their own resistance. In this implementation mode, the first resistance module and/or the second resistance module playing the current limiting role can adjust their own resistance by sensing the intensity of external light, thereby realizing an adaptive adjustment of color temperature or brightness. A proportional photoresistor or an inverse proportional photoresistor can be used based on actual needs.

According to another embodiment of the present invention, the first resistance module and the second resistance module adopt a rheostat whose resistance values can be manually adjusted, and the user can manually adjust the resistance values of the first resistance module and/or the second resistance module through an adjustment device provided, such as a knob, a paddle, etc.

Preferably, the first light source module comprises a plurality of first lamp beads with the first lamp beads arranged in a first matrix of P rows and Q columns; the second light source module comprises a plurality of second lamp beads with the second lamp beads arranged in a second matrix of N rows and M columns; the first lamp beads of a column Q and the second lamp beads of a column M are alternately distributed; P, Q, N, M are all positive integers.

According to another embodiment of the present invention, through the alternating distribution of the first lamp beads and the second lamp beads allows for more uniform color mixing.

Figure 6:
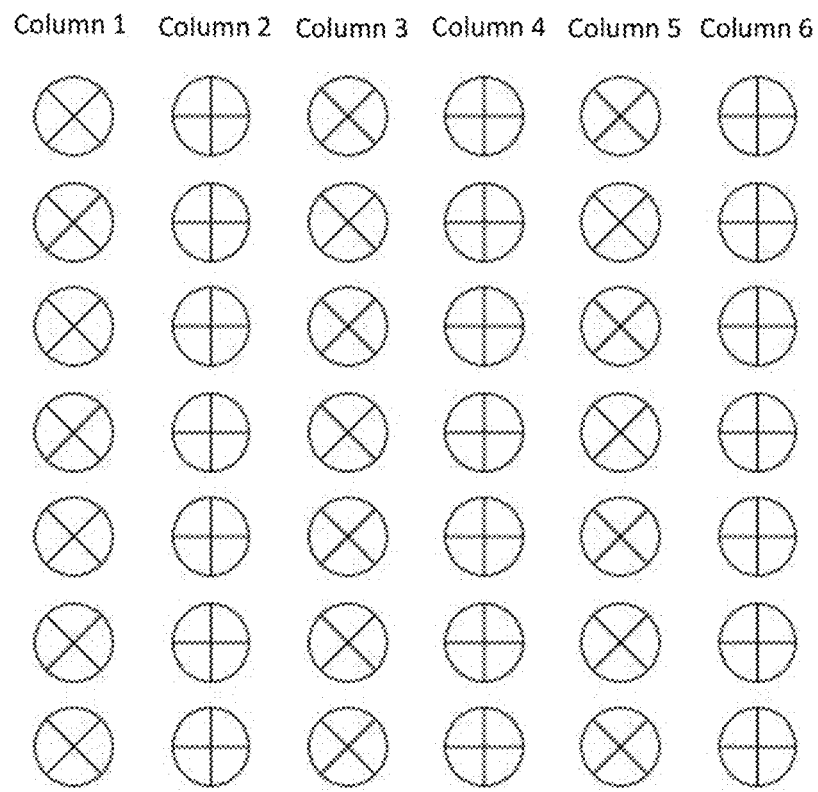
FIG. 6 is a schematic diagram of a first light source module and a second light source module according to an embodiment of the present invention.

Referring to FIG. 6, a schematic diagram of a first light source module and a second light source module according to an embodiment of the present invention is provided.

The first light source module is a first matrix of 7 rows and 3 columns comprising 21 first light beads in columns 1, 3, and 5 in the schematic diagram as shown in FIG. 6. The second light source module is a second matrix of 7 rows and 3 columns comprising 21 first light beads in columns 2, 4, and 6 in the schematic diagram as shown in FIG. 6. In an arrangement mode, the first lamp beads in each column and the second lamp beads in each column are distributed alternately.

In other embodiments of the present invention, the lamp beads in the first light source module and the second light source module may also adopt an annular alternating distribution.

Embodiment 2

Figure 7:
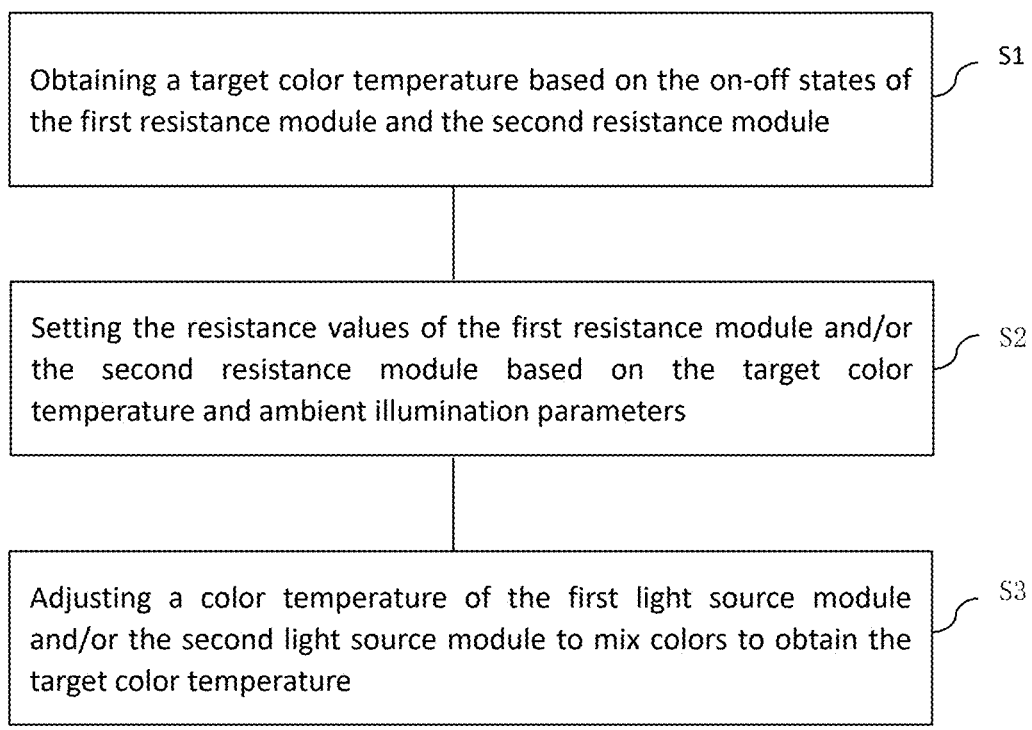
FIG. 7 is a schematic flow diagram of a color mixing method for light sources according to an embodiment of the present invention.

According to the color mixing circuit for light sources in embodiment 1, referring to FIG. 7, an embodiment of the present invention further provides a color mixing method for light sources comprising:

S1: obtaining a target color temperature based on on-off states of a first resistance module and a second resistance module, with different on-off states corresponding to different target color temperatures;

Specifically, in an initial state, the first resistance module and the second resistance module are at a default resistance value, and the on-off states of the first resistance module and the second resistance module are set by users, so that a color temperature value desired by the users can be reflected, with the different on-off states corresponding to the different target color temperatures. For example, and without limitation, when the first resistance module is in a first on-off state, the first resistance module is powered on and the second resistance module is powered off. When the first resistance module is at the default resistance value, the color temperature obtained by color mixing between a first light source module and a second light source module is the target color temperature. According to an embodiment of the present invention, the color temperature of the first light source module is 5000K, the color temperature of the second light source module is 2700K, the target color temperature is 4000K in the first on-off state, the target color temperature is 3500K in a second on-off state, and the target color temperature is 3000K in a third on-off state.

S2: setting resistance values of the first resistance module and/or the second resistance module based on the target color temperature and ambient illumination parameters;

Specifically, under an action of ambient light, the color temperature obtained by color mixing may not be the target color temperature desired by the user, and at this time, the ambient illumination parameters are inductively obtained by a light sensor, and the resistance values of the first resistance module and/or the second resistance module are adjusted in different on-off states, thereby realizing an adaptive adjustment of the color temperature. In the first on-off state, the resistance values of the first resistance module is adjusted according to the target color temperature and the ambient illumination parameters, the luminous intensity of a first light-emitting module is adjusted to adjust the color temperature, and in the third on-off state, the resistance values of the second resistance module is adjusted according to the target color temperature and the ambient illumination parameters, so to realize the target color temperature by color mixing and reduce an influence of ambient light.

Preferably, the ambient illumination parameters comprise: an ambient light intensity and an ambient light color temperature, the step of setting the resistance values of the first resistance module and/or the second resistance module based on the target color temperature and ambient illumination parameters comprising:

S21: normalizing and weighting the ambient light intensity and the ambient light color temperature to obtain an influence degree of the ambient illumination parameter on the target color temperature;

Specifically, the ambient light intensity and the ambient light color temperature have different effects on the target color temperature and need to be uniformly quantified. A normalization process makes parameters of different units and dimensions comparable, converting the ambient light intensity and the ambient light color temperature to a same order of magnitude, such as a range of 0 to 1. A common approach is to subtract a minimum from a current value and divide by a maximum minus a minimum. The ambient light intensity and the ambient light color temperature are weighted to reflect a relative influence of the ambient light intensity and the ambient light color temperature on the target color temperature. Weights can be determined based on empirical or experimental data. Normalized parameters are multiplied by corresponding weights and then summed to obtain the influence degree of the ambient illumination parameter on the target color temperature.

Standardization makes all parameters comparable under a same scale, which improves accuracy and rationality of calculation. By quantifying the influence degree, effects of ambient illumination conditions on the target color temperature can be more accurately judged, so to better adjust the light source module. Influences of each parameter on a final result can be adjusted according to an actual situation by weighting.

S22: setting the resistance values of the first resistance module and the second resistance module as default resistance values when the influence degree is less than or equal to a preset influence degree;

Specifically, the preset influence degree is to set a threshold value based on the empirical or experimental data, indicating a degree to which the influence of ambient light can be ignored. When the ambient light has little influence on the target color temperature, the default resistance values can be used to simplify an adjustment process and save time and resources. The default resistance value is usually a value optimized at design time, which will provide good results in most cases. If the influence degree is less than or equal to the preset influence degree, a preset default resistance value is used without further adjustment. With little change in the ambient light, a stable light output can be maintained to avoid frequent adjustments.

S23: obtaining an actual color temperature based on the ambient light intensity, the ambient light color temperature and the target color temperature when the influence degree is greater than the preset influence degree;

Specifically, when the ambient light has a large impact on the target color temperature, the actual color temperature needs to be recalculated to ensure that the color temperature of output light source is accurate, with the ambient light intensity and ambient light color temperature combined and corrected for the target color temperature to obtain the actual color temperature. Considering how the ambient light intensity and the ambient light color temperature affect a final color temperature, when the ambient light intensity is high, the color temperature of the light sources may need to be reduced to balance a cool tone of the ambient light, and when the ambient light color temperature is high, the color temperature of the light sources may need to be increased to balance the cool tone of the ambient light.

According to an embodiment of the present invention, the actual color temperature can be obtained by matching a mapping relationship, which specifically comprises:

establishing a database containing a relationship between various ambient light intensities, ambient light color temperatures, target color temperatures and actual color temperatures in advance, which can be constructed from the experimental data or historical data;

acquiring a light intensity and a color temperature of current environment and inputting a desired target color temperature; and finding a most matching record in the database based on input ambient light parameters and the target color temperature. This process can be done using nearest neighbor matching, interpolation, etc. A found record comprises a pre-calculated actual color temperature, which is extracted directly. Using a pre-established database, the actual color temperature can be quickly found and applied, reducing a burden of real-time calculations.

S24: determining the resistance values of the first resistance module and/or the second resistance module based on the actual color temperature.

Preferably, the on-off states of the first resistance module and the second resistance module comprise a first on-off state, a second on-off state, a third on-off state, and a fourth on-off state; in the first on-off state, the first resistance module is powered on and the second resistance module is powered off; in the second on-off state, both the first resistance module and the second resistance module are powered off; in the third on-off state, the first resistance module is powered off and the second resistance module is powered on.

Specifically, in this embodiment, the on-off states comprise a first on-off state, a second on-off state, and a third on-off state and details of each on-off state can be referred to the table of FIG. 3, and will not be repeated herein;

The step of determining the resistance values of the first resistance module and/or the second resistance module based on the actual color temperature comprises:

S241: when in the first on-off state, judging whether the first light source module and the second light source module can mix colors to obtain the actual color temperature based on the initial color temperature of the first light source module and the resistance range of the first resistance module;

Specifically, in order to determine whether the first light source module and the second light source module can achieve a required actual color temperature by mixing the light sources, the initial color temperatures of the first light source module and the second light source module (that is, color temperatures without adding any resistance value) are first read. In the first on-off state, the first resistance module is powered on and the second resistance module is powered off, an adjustable range of the first resistance module is determined, and based on a current on-off state, whether a combination of the first light source module and the second light source module within the adjustable range can reach the actual color temperature is simulated.

S242: if the first light source module and the second light source module can mix colors to obtain the actual color temperature, determining a first target color temperature of the first light source module based on the actual color temperature and the initial color temperature of the second light source module;

Specifically, under a premise of determining that the actual color temperature can be achieved by color mixing, a color temperature to be achieved by the first light source module is specifically determined, and based on the actual color temperature and the initial color temperature of the second light source module (a fixed value), the target color temperature of the first light source module is calculated, which is recorded as the first target color temperature, and a specific color temperature value to be achieved by the first light source module is clarified to provide a basis for a subsequent adjustment of the resistance values.

S243: determining the resistance values of the first resistance module based on the first target color temperature and the resistance range of the first resistance module;

Specifically, according to a relationship between the first target color temperature and the resistance values of the first resistance module, a specific resistance value setting of the first resistance module is calculated, and a specific resistance value of the first resistance module is determined to adjust the color temperature of the first light source module to the target color temperature.

S244: when in the third on-off state, judging whether the first light source module and the second light source module can mix colors to obtain the actual color temperature based on an initial color temperature of the first light source module and the resistance range of the first resistance module;

Specifically, in the third on-off state, determining whether the first light source module and the second light source module can reach the actual color temperature by color mixing, and reading the initial color temperature of the first light source module and the second light source module and the adjustable range of the second resistance module; Based on the third on-off state (the first resistance module is powered off and the second resistance module is powered on), simulating whether various combinations within the resistance range can reach the actual color temperature, thereby ensuring that a mixed color temperature of the two light sources can reach the actual color temperature by adjusting the resistance values of the second light source module in the third on-off state.

S245: if the first light source module and the second light source module can mix colors to obtain the actual color temperature, determining a second target color temperature of the second light source module based on the actual color temperature and the initial color temperature of the first light source module;

Specifically, under the premise of determining that the actual color temperature can be achieved by color mixing, the color temperature to be achieved by the second light source module is specifically determined, and based on the actual color temperature and the initial color temperature of the first light source module (the fixed value), the target color temperature of the second light source module is calculated, which is recorded as the second target color temperature, and the specific color temperature value to be achieved by the second light source module is clarified to provide the basis for the subsequent adjustment of the resistance values.

S246: determining the resistance values of the second resistance module based on the second target color temperature and the resistance range of the second resistance module;

Specifically, based on the relationship between the second target color temperature and the resistance values of the second resistance module, the specific resistance value setting of the second resistance module is calculated, and the color temperature of the second light source module is adjusted to the target color temperature by determining the specific resistance value of the second resistance module.

S247: when in the first on-off state or the third on-off state and the first light source module and the second light source module cannot mix colors to obtain the actual color temperature, switching the on-off state to the fourth on-off state, wherein in the fourth on-off state, both the first resistance module and the second resistance module are powered on;

Specifically, in the first on-off state or third on-off state, switching is triggered if a color mixing target cannot be achieved by adjustment, wherein in the first on-off state, the first resistance module is powered on and the second resistance module is powered off. In this state, the color temperature of the first light source module can only be changed by adjusting the resistance values of the first resistance module. However, this may not cover a range of color temperatures required for the actual color temperature;

Similarly, in the third on-off state, the first resistance module is powered off and the second resistance module is powered on. In this state, the color temperature of the second light source module can only be changed by adjusting the resistance values of the second resistance module, which, again, may fail to meet requirements on the actual color temperature;

When only one resistance module is operating, a color temperature adjustment capability of the two light source modules is limited. If the color temperature value required by the actual color temperature exceeds an adjustment range of a single light source module, then the color mixing target cannot be achieved. In the fourth on-off state, both resistance modules are powered on, which means that the first resistance module and second resistance module can be adjusted at a same time, greatly increasing adjustment flexibility of a system and color temperature range coverage. Since finer adjustments are required to maintain stable output of the target color temperature under complex ambient luminous conditions, simultaneous adjustment of the two resistance modules happens to be better adapted to environmental changes and improves stability and adaptability of the system.

S248: determining the resistance values of the first resistance module and the resistance values of the second resistance module based on the initial color temperature of the first light source module and the second light source module, the actual color temperature, and the resistance range of the first resistance module and the second resistance module.

Specifically, in the fourth on-off state, the specific resistance values of the first resistance module and the second resistance module are finalized by first reading the color temperature, the actual color temperature, and the resistance range of the first light source module and the second light source module. Considering all parameters together, respective desired color temperatures of the first light source module and the second light source module are obtained. The respective color temperatures of the first light source module and the second light source module can likewise be obtained by means of above-mentioned pre-established database comprising the relationship between various ambient light intensities, ambient light color temperatures, target color temperatures, and the actual color temperatures, Finally, according to a relationship between the color temperature and the resistance values of respective light source modules, the respective resistance values of the first resistance module and the second resistance module are obtained.

By precisely adjusting the resistance values, it ensures that an output color temperature of the light sources is consistent with calculated actual color temperatures, improving precision and reliability of a light source system, and satisfying light requirements in different environments.

Preferably, the step of determining the resistance values of the first resistance module and the resistance values of the second resistance module based on the initial color temperature of the first light source module and the second light source module, the actual color temperature, and the resistance range of the first resistance module and the second resistance module comprises:

S2481: obtaining a first color temperature adjustment range and a second color temperature adjustment range of the first light source module and the second light source module respectively based on the initial color temperature of the first light source module and the second light source module and the resistance range of the first resistance module and the second resistance module;

Specifically, the initial color temperature of the first light source module and the second light source module in a case of no obstruction value is first obtained, and a color temperature adjustment range of the first light source module can be obtained according to the initial color temperature of the first light source module and the resistance range of the first resistance module, which is denoted as the first color temperature adjustment range. Similarly, according to the initial color temperature of the second light source module and the resistance range of the second resistance module, the color temperature adjustment range of the second light source module can be obtained, which is recorded as the second color temperature adjustment range. By clarifying an adjustable range of each light source module under different resistance values, it is ensured that a controllable range is not exceeded during the adjustment process.

S2482: obtaining a plurality of mixed color temperature combinations based on the first color temperature adjustment range, the second color temperature adjustment range, and the actual color temperature, wherein the mixed color temperature combinations comprise a first color temperature value of the first light source module and a second color temperature value of the second light source module, and the first color temperature value and/or the second color temperature value of each of the mixed color temperature combinations are different;

Because the color temperature of a mixed color formed by a color temperature combination of the two light source modules is determined by the color temperature and intensity of the two, this combination relationship is multi-dimensional, so multiple combinations will be produced. In order to achieve a requirement of being close to the target color temperature, the system may produce multiple color temperature combinations close to the target color temperature, and the color temperature of each combination may be slightly different, but they are all within an allowable error range.

Based on the color temperature adjustment range of the first light source module and the second light source module, and the target color temperature, a plurality of mixed color temperature combinations are listed, each mixed color temperature combination comprising the first color temperature value of the first light source module and the second color temperature value of the second light source module;

The mixed color temperature combinations can be obtained by setting a step subdivision of the first color temperature adjustment range and second color temperature adjustment range. For example, for a step size of 100 K, all first possible color temperature values and second possible color temperature values for the first light source module and the second light source module are listed. For each of the first possible color temperature values and the second possible color temperature values, the color temperature obtained after color mixing is calculated, and when differences between a calculated color temperature and the actual color temperature is less than a preset error range of the color temperature, it can be recorded, so to obtain the mixed color temperature combinations and to provide a plurality of potential color temperature combination schemes, setting a foundation for a subsequent selection of a best combination.

S2483: obtaining resistance combinations corresponding to each of the mixed color temperature combinations, wherein the resistance combinations comprise a first resistance value of the first resistance module and a second resistance value of the second resistance module;

Specifically, in calculating each mixed color temperature combination, the first resistance value of the first resistance module and the second resistance value of the second resistance module corresponding to each mixed color temperature combination are calculated, so that the mixed color temperature combinations are associated with actual hardware adjustment parameters, which facilitates the subsequent adjustment.

S2484: obtaining a color temperature similarity index of each of the resistance combinations according to the mixed color temperature combinations corresponding to each of the resistance combinations and the actual color temperature;

Specifically, differences between a mixed color temperature produced by each of the resistance combinations and the target actual color temperature are compared, and the color temperature similarity index is calculated to ensure that a selected resistance combination produces an effect that is close to the target color temperature. The color temperature similarity index can be obtained by normalizing the differences between a color temperature value after color mixing and the actual color temperature, and a normalization process makes scores have a uniform standard, which is convenient for comparison and screening.

S2485: obtaining current combinations corresponding to each of the resistance combinations based on voltage values output by the power supply module to the first light source module and the second light source module, wherein the current combinations comprise a first current value of the first light source module and a second current value of the second light source module;

Specifically, based on the voltage values output by the power supply module to the first light source module and the second light source module, the first current value and the second current value corresponding to each resistance combination are calculated, and current distributions of the two light source modules under each resistance combination are clarified, so to provide data for a subsequent calculation of a degree of balance and power consumption.

S2486: obtaining an output balance index of a corresponding resistance combination based on the current combinations;

Specifically, the output balance index is used to characterize a balance of the two light source modules during operation. By comparing and calculating a ratio of current values of the two light source modules with a preset ideal ratio, the output balance index can be obtained. The preset ideal ratio is usually set to 1, indicating a complete balance; Balanced output can ensure that the color temperature and brightness of mixed light sources are more stable and uniform, avoiding a situation where the light source is too strong or too weak. A higher output balance improves a quality of the light source and user experience, reduces irregularities in the color temperature and brightness, and improves the reliability and lifetime of equipment.

S2487: obtaining a power consumption index and a temperature index of each of the resistance combinations based on the current combinations and the corresponding resistance combination;

Specifically, the power consumption index represents power consumptions of the light source module under different resistance combinations. Lower power consumption can reduce energy consumption and improve energy efficiency of equipment. Temperature performance of the light source module under different resistance combinations can be evaluated by temperature scoring. Lower temperatures can reduce a risk of overheating of equipment and improve stability and safety of equipment.

For resistance modules, actual power consumption (P) can be calculated by resistance (R) and current (I): $P=I^2*R$, wherein the power consumption will cause a temperature rise of the resistance modules. Assuming that heat generation is proportional to the power consumption, the temperature rise can be calculated by a following equation: $\Delta T=k*P$, where k is a constant related to heat dissipation conditions;

Combined with the actual power consumption, the power consumption index can be obtained by setting an ideal power consumption range and allowable maximum power consumption, and a power consumption value can be obtained by a ratio of difference between the actual power consumption and ideal power consumption to the maximum power consumption. The closer the actual power consumption is to an ideal value, the higher the power consumption index is;

Similarly, the temperature index can also be obtained by the ratio of the difference between a calculated temperature and an ideal temperature to the maximum temperature based on a set ideal temperature range and an allowable maximum temperature. The closer the temperature is to the ideal value, the higher the temperature index is.

S2488: screening the resistance combinations based on the color temperature similarity index, the output balance index, the power consumption index and the temperature index of each of the resistance combinations to obtain at least one target resistance combination;

Specifically, in this step, the resistance combination is screened according to the color temperature similarity index, the output balance index, the power consumption index, and the temperature index of each of the resistance combinations to obtain at least one target resistance combination;

According to an embodiment of the present invention, an evaluation result may be obtained by performing a weighting operation on the color temperature similarity index, the output balance index, the power consumption index, and the temperature index of each of the resistance combinations. The weighting operation is aimed to comprehensively consider weights of each index to obtain a final numerical evaluation result. The resistance combination with a best evaluation result is taken as the target resistance combination, a highest value indicating the best evaluation result. A setting of weights can be adjusted according to specific application scenarios and needs. For scenarios requiring high-precision color temperature control, the color temperature similarity index can be given a higher weight. For scenarios requiring balanced output (such as photography or medical lighting), the output balance index can be given a higher weight. For scenarios requiring energy saving, the power consumption index can be given a higher weight. For scenarios requiring high stability and safety, the temperature index can be given a higher weight.

In a specific embodiment, precise control of the color temperature is critical for many lighting application scenarios, such as home lighting, office lighting, and commercial displays. Users want to get a stable and expected color temperature to ensure comfort and consistency of environment, so the color temperature similarity index is set to 0.4;

In many applications, especially scenarios where multiple light source modules are required to work together, such as photography, medical lighting, and stage lighting, a balance of light source output is critical. The balanced output avoids problems with shadows and uneven brightness, so the output balance index is set to 0.3;

In modern society, energy conservation has become an important consideration. Reducing power consumption can not only reduce energy consumption, but also reduce operating costs and prolong a service life of battery-powered equipment, so a power consumption weight is set to 0.2;

While temperature management is necessary, it may not be as urgent and important as color temperature and output balance in many common scenarios. However, proper temperature management can still reduce the overheating risk of equipment and improve the reliability and life of equipment, so the weight of temperature index is set to 0.1;

This weight setting can balance various important factors in general lighting control scenarios, ensuring the precise control of the color temperature, balance of output, reasonable power consumption and proper temperature management. This setup can provide good performance and user experience in most situations, accommodating a variety of common lighting needs. Specific weights can also be fine-tuned according to actual needs to meet requirements of special scenarios.

S2489: determining the resistance values of the first resistance module and the second resistance module based on the resistance combination with a highest target index.

Determining the resistance values of the first resistance module and the second resistance module based on the target resistance combination.

Finally, according to the resistance combination with the highest target index, final resistance values of the first resistance module and the second resistance module are determined to ensure that the system achieves a best effect in terms of color temperature matching, energy efficiency, temperature management and output balance.

These steps explain in detail how a series of calculations and evaluations can be performed to determine an optimal resistance combination from the initial color temperature and environmental parameters, with each step providing critical support in achieving the target color temperature, ensuring that the system is optimized in every performance index.

S3: adjusting a color temperature of the first light source module and/or the second light source module to mix colors to obtain the target color temperature.

Finally, according to a set resistance value, the output color temperature of the first light source module and the second light source module change, and light outputs of the two light source modules are mixed to obtain the desired target color temperature. Through above steps, the resistance values of the first resistance module and the second resistance module can be reasonably set according to the on-off states, the target color temperature and the ambient illumination parameters, and the color temperatures of the first light source module and second light source module can be adjusted to achieve an accurate target color temperature; In a preferred embodiment, the step S3 specifically comprises:

S31: obtaining accumulated usage duration of the first light source module and the second light source module;

Specifically, in an ideal state, the resistance values obtained in the step S2 can adjust the color temperature of the first light source module and/or the second light source module to obtain the target color temperature by color mixing, but since the luminous intensity of a light emitting module attenuates as usage duration increases, the cumulative usage duration of the first light source module and the second light source module is obtained in this step. Since both the first light source module and the second light source module are constantly on in a working state, the first light source module and the second light source module have a same cumulative usage duration, and the cumulative usage duration can be obtained by an internal timer.

S32: obtaining a first luminous intensity attenuation amount of the first light source module and a second luminous intensity attenuation amount of the second light source module based on luminous intensity attenuation curves of the first light source module and the second light source module and the accumulated usage duration;

Specifically, in an operation instruction or a technical specification of a light source product, a curve or table data of attenuations of the luminous intensity with the use duration is provided, and the first luminous intensity attenuation amount of the first light source module and the second luminous intensity attenuation amount of the second light source module can be obtained through the luminous intensity attenuation curves of the first light source module and the second light source module.

S33: when the first luminous intensity attenuation amount is greater than a first preset threshold value, or the second luminous intensity attenuation amount is greater than a second preset threshold value, or a sum of the first luminous intensity attenuation amount and the second luminous intensity attenuation amount multiplied by a preset attenuation coefficient is greater than a third preset threshold value, determining a resistance adjustment amount of the first resistance module and/or the second resistance module based on the first luminous intensity attenuation amount and the second luminous intensity attenuation amount;

Specifically, if the luminous intensity attenuation amount of a single light source exceeds a preset threshold, it may cause a significant change in the output color temperature of the light sources and affect color mixing effect. Therefore, it is necessary to monitor the attenuation of the first light source and the second light source respectively, so to adjust the resistance values in time and maintain the target color temperature. An influence of overall light output of the light source module on the color mixing effect is cumulative. Even if the attenuation of a single light source is not obvious, cumulative attenuation of the first light source and the second light source may lead to a significant color temperature deviation. By using a coefficient to comprehensively consider the attenuation of the first light source and the second light source, the overall light output is balanced and the color temperature after mixing is stable.

Specifically, if the luminous intensity attenuation amount of the first light source module is greater than the first preset threshold value, it indicates that the luminous intensity of the first light source module has been significantly attenuated, which may cause color temperature output of the first light source module to deviate from expectations, and the resistance values of the first light source module need to be adjusted to compensate for the attenuation. If the luminous intensity attenuation amount of the second light source module is greater than the second preset threshold value, it means that the luminous intensity of the second light source module has been significantly attenuated, which may cause the color temperature output to deviate from the expectations, and the resistance values of the second light source module need to be adjusted to compensate for the attenuation. If a sum of the first luminous intensity attenuation amount and the second luminous intensity attenuation amount multiplied by a preset attenuation amount coefficient is greater than the third preset threshold value, it indicates that the luminous intensity of an entire light source module has been significantly attenuated, which may cause total light output and color temperature of the mixed light sources to deviate from the expectations, and the resistance values of the two need to be adjusted to compensate for overall attenuation.

The first preset threshold value and the second preset threshold value is set to individually monitor the attenuation of each light source module. Usually, these two thresholds can be the same or slightly different, with specific values to be determined according to the service life and performance requirements of a product; The third preset threshold value is used to determine influences of the cumulative attenuation of the first light source module and the second light source module on the overall light output, which is greater than the first preset threshold value and the second preset threshold value, and may be set to 1.5 to 2 times a sum of the two. For example, if the first threshold value and second threshold value are 10%, the third preset threshold value may be set to 30%.

The coefficient is used to weigh an overall effect of both attenuations and is adjusted based on the empirical and experimental data, typically between 0.5 and 1.5. Specific values can be optimized through debugging and experiments, and no specific limitations are made here.

When in the first on-off state, only the first resistance module is turned on, so the resistance adjustment amount of the first resistance module is determined according to the luminous intensity attenuation amount of the first light source module and the luminous intensity attenuation amount of the second light source module, and the attenuation amounts of the two light source modules are compensated by adjusting the first resistance module;

Similarly, when in the second on-off state, only the second resistance module is turned on, so the resistance adjustment amount is determined according to the luminous intensity attenuation amount of the first light source module and the attenuation amount of the second light source module, and the attenuation amounts of the two light source modules are compensated by adjusting the second resistance module;

When the first resistance module and the second resistance module are in a fourth conduction state, a first resistance adjustment amount of the first resistance module is determined by the luminous intensity attenuation amount of the first light source module; a second resistance adjustment amount of the second resistance module is determined by the luminous intensity attenuation amount of the second light source module;

The resistance adjustment amount is set to compensate for a decrease in the luminous intensity caused by total attenuation, and ensure that a total intensity and the color temperature of the output light source are maintained within a design target.

The luminous intensity is proportional to currents passing through the light source module, and the luminous intensity can be improved by increasing the currents, which are controlled by a resistance adjustment. A decrease in the resistance values increases the currents passing through the light source module, thereby increasing the luminous intensity. The attenuation amount refers to a percentage reduction of the luminous intensity of the light source module. In order to compensate for the attenuation amount, it is necessary to increase the currents passing through the light source module, and if the attenuation amount is large, the resistance valued can be appropriately reduced to increase driving currents of the first light source module and the second light source module, thereby improving the luminous intensity; A specific calculation can be realized by a following process:

First, current increments to be compensated are calculated according to the attenuation, and the current increments to be increased can be determined by using characteristics of the light source module (a relationship between the luminous intensity and currents). Under an assumption that Ohm's law $V=I*R$ and a power supply voltage $V$ remains unchanged, an adjusted resistance value is calculated.

S34: adjusting the color temperature of the first light source module and/or the second light source module based on the resistance value of the first resistance module and/or the second resistance module and the resistance value adjustment amount to obtain the target color temperature by color mixing.

Finally, resistance reductions corresponding to the luminous intensity attenuation amount are combined with an initial resistance of the first resistance module and/or the second resistance module to determine an actual resistance value to be set, thereby changing the output color temperature; Through above steps, it can be ensured that even if the light source module is attenuated during use, the desired target color temperature can be maintained by adjusting the resistance modules, thereby achieving stable light efficiency output.

Embodiment 3

An embodiment of the present invention further provides an electronic device comprising a color mixing apparatus for light sources, including the color mixing circuit for light sources with reference to FIGS. 1-6, or the color mixing apparatus for light sources adopts the color mixing method for light sources described in embodiment 2.

The electronic device in an embodiment of the present invention may be an intelligent light fixture, such as an intelligent table lamp, a ceiling lamp, an intelligent light strip. The intelligent light fixture typically includes a plurality of LED light source modules with adjustable color temperature and brightness, and is equipped with the color mixing circuit for light sources to achieve a precise control of color temperature and brightness. The smart fixture may also include sensors, controllers, and communication modules for interacting with other smart devices or control systems;

The on-off states of the first resistance module are controlled by the circuit gating module, so that the first resistance module plays the current limiting role in the entire circuit, or makes the first resistance module in a powered-off state, and the circuit gating module also controls the on-off states of the second resistance module, so that the second resistance module plays the current limiting role in the entire circuit, or makes the second resistance module in the powered-off state. When the first resistance module plays the current limiting role, the luminous intensity of the first light source module is changed. Similarly, when the second resistance module plays the current limiting role, the luminous intensity of the second light source module is changed. If the luminous intensity of the first light source module is weakened greater than that of the second light source module, the color temperature of an entire light source will decrease. On the contrary, if the luminous intensity of the first light source module is weakened less than that of the second light source module, the color temperature of the entire light source will increase. During an entire color mixing process, the first light source module and the second light source module always maintain a light-emitting state, so there is no dark area and the light source utilization rate is significantly higher than that of the existing technology.

The color mixing circuit, method and electronic device for light sources provided by the present invention are described in detail above, and those skilled in the art will further understand that various illustrative logic blocks, modules, circuits and algorithmic steps described in conjunction with the embodiments disclosed herein may be implemented as electronic hardware, computer software, or combinations thereof. For the purpose of clearly illustrating hardware and software interchangeability, various illustrative components, blocks, modules, circuits, and steps have been described above in generally functional terms. The implementation of the functionality as hardware or software depends on the particular use and design constraints imposed on the system as a whole. Those skilled in the art may implement the described functionality in different ways for each specific use, and any equivalent structure or equivalent process transformation utilizing the contents of the specification of the present invention and the accompanying drawings, or any direct or indirect application in other related fields of technology, are all similarly fall in the scope of the present invention, and should not be construed as a limitation of the present invention.

What is claimed is:

1. A color mixing method for light sources, used in a color mixing circuit for light sources, wherein the color mixing circuit for light sources comprises
a power supply module,
a first light source module,
a second light source module,
a first resistance module,
a second resistance module, and
a circuit gating module;
the first light source module is connected to the power supply module and the circuit gating module, respectively;
the first light source module is further connected to the circuit gating module via the first resistance module;
the second light source module is connected to the power supply module and the circuit gating module respectively;
the second light source module is further connected to the circuit gating module via the second resistance module;
the circuit gating module is further connected to the power supply module;
the first light source module and the second light source module are used for emitting light, with a color temperature value of the first light source module greater than a color temperature value of the second light source module;
the first resistance module and the second resistance module are configured to adjust a total circuit resistance of each resistance module;
the circuit gating module is configured to control an on-off states of the first resistance module and the second resistance module, wherein
the on-off states of the first resistance module and the second resistance module comprise a first on-off state, a second on-off state, a third on-off state, and a fourth on-off state; wherein
in the first on-off state, the first resistance module is powered on and the second resistance module is powered off;
in the second on-off state, both the first resistance module and the second resistance module are powered off;
in the third on-off state, the first resistance module is powered off and the second resistance module is powered on;
in the fourth on-off state, both the first resistance module and the second resistance module are powered on;
wherein the first resistance module and the second resistance module configured to sense strength of external light in order to adjust resistance values of the first resistance module and the second resistance module,
the color mixing method for light sources comprising:
obtaining a target color temperature based on the on-off states of the first resistance module and the second resistance module, wherein, each of the on-off states of the first resistance module and the second resistance module corresponding to a different target color temperature;
setting the resistance values of the first resistance module and/or the second resistance module based on the target color temperature and ambient illumination parameters, wherein
the ambient illumination parameters comprise:
an ambient light intensity and an ambient light color temperature, the step of setting the resistance values of the first resistance module and/or the second resistance module based on the target color temperature and ambient illumination parameters comprising:
normalizing and weighting the ambient light intensity and the ambient light color temperature to obtain an influence degree of the ambient illumination parameters on the target color temperature;
setting the resistance values of the first resistance module and the second resistance module as default resistance values when the influence degree is less than or equal to a preset influence degree;
obtaining an actual color temperature based on the ambient light intensity, the ambient light color temperature and the target color temperature when the influence degree is greater than the preset influence degree;
determining the resistance values of the first resistance module and/or the second resistance module based on the actual color temperature;
adjusting a color temperature of the first light source module and/or the second light source module to mix colors to obtain the target color temperature.

2. The color mixing method for light sources according to claim 1, wherein
the step of determining the resistance values of the first resistance module and/or the second resistance module based on the actual color temperature comprises:
when in the first on-off state, judging whether the first light source module and the second light source module can mix colors to obtain the actual color temperature based on an initial color temperature of the first light source module and a resistance range of the first resistance module;
when the first light source module and the second light source module can mix colors to obtain the actual color temperature,
determining a first target color temperature of the first light source module based on the actual color temperature and an initial color temperature of the second light source module;
determining the resistance values of the first resistance module based on the first target color temperature and the resistance range of the first resistance module;
when in the third on-off state, judging whether the first light source module and the second light source module can mix colors to obtain the actual color temperature based on the initial color temperature of the first light source module and the resistance range of the first resistance module;
when the first light source module and the second light source module can mix colors to obtain the actual color temperature, determining a second target color temperature of the second light source module based on the actual color temperature and the initial color temperature of the first light source module;
determining the resistance values of the second resistance module based on the second target color temperature and a resistance range of the second resistance module;

when in the first on-off state or the third on-off state and the first light source module and the second light source module cannot mix colors to obtain the actual color temperature, switching the on-off state to the fourth on-off state; and determining the resistance values of the first resistance module and the resistance values of the second resistance module based on the initial color temperature of the first light source module and the second light source module, the actual color temperature, the resistance range of the first resistance module, and the resistance range of the second resistance module.

3. The color mixing method for light sources according to claim 1, further comprising determining the resistance values of the first resistance module and the resistance values of the second resistance module based on an initial color temperature of the first light source module and the second light source module, the actual color temperature, and a resistance range of the first resistance module and the second resistance module by:

obtaining a first color temperature adjustment range and a second color temperature adjustment range of the first light source module and the second light source module respectively based on the initial color temperature of the first light source module and the second light source module and the resistance range of the first resistance module and the second resistance module;

obtaining a plurality of mixed color temperature combinations based on the first color temperature adjustment range, the second color temperature adjustment range, and the actual color temperature, wherein the mixed color temperature combinations comprise a first color temperature value of the first light source module and a second color temperature value of the second light source module, and the first color temperature value and/or the second color temperature value of each of the mixed color temperature combinations are different;

obtaining resistance combinations corresponding to each of the mixed color temperature combinations, wherein the resistance combinations comprise a first resistance value of the first resistance module and a second resistance value of the second resistance module;

obtaining a color temperature similarity index of each of the resistance combinations according to the mixed color temperature combinations corresponding to each of the resistance combinations and the actual color temperature;

obtaining current combinations corresponding to each of the resistance combinations based on voltage values output by the power supply module to the first light source module and the second light source module, wherein the current combinations comprise a first current value of the first light source module and a second current value of the second light source module;

obtaining an output balance index of a corresponding resistance combination based on the current combinations;

obtaining a power consumption index and a temperature index of each of the resistance combinations based on the current combinations and the corresponding resistance combination;

screening the resistance combinations based on the color temperature similarity index, the output balance index, the power consumption index and the temperature index of each of the resistance combinations to obtain at least one target resistance combination; and determining the resistance values of the first resistance module and the second resistance module based on the target resistance combination.

4. The color mixing method for light sources according to claim 3, wherein the step of determining the resistance values of the first resistance module and the resistance values of the second resistance module based on the initial color temperature of the first light source module and the second light source module, the actual color temperature, and the resistance range of the first resistance module and the second resistance module comprises:

obtaining accumulated usage duration of the first light source module and the second light source module;

obtaining a first luminous intensity attenuation amount of the first light source module and a second luminous intensity attenuation amount of the second light source module based on luminous intensity attenuation curves of the first light source module and the second light source module and the accumulated usage duration;

when the first luminous intensity attenuation amount is greater than a first preset threshold value, or the second luminous intensity attenuation amount is greater than a second preset threshold value, or a sum of the first luminous intensity attenuation amount and the second luminous intensity attenuation amount multiplied by a preset attenuation coefficient is greater than a third preset threshold value, determining a resistance adjustment amount of the first resistance module and/or the second resistance module based on the first luminous intensity attenuation amount and the second luminous intensity attenuation amount, wherein the third preset threshold value is greater than the first preset threshold value and the second preset threshold value, and the preset attenuation coefficient is between 0.5 and 1.5; and adjusting the color temperature of the first light source module and/or the second light source module based on the resistance value of the first resistance module and/or the second resistance module and the resistance value adjustment amount to obtain the target color temperature by color mixing.

5. The color mixing method for light sources according to claim 1, wherein the first light source module comprises a first light source, the second light source module comprises a second light source, the first resistance module comprises a first resistor, the second resistance module comprises a second resistor, and the circuit gating module comprises a three-position dip switch;

an input terminal of the first light source is connected to a positive pole of a power supply, an output terminal of the first light source is connected to a third pin, a fourth pin and a fifth pin of the three-position dip switch, wherein the first resistor connected in series between the fourth pin and the output terminal of the first light source;

an input terminal of the second light source is connected to the positive pole of the power supply, an output terminal of the second light source is connected to a first pin, a seventh pin and an eighth pin of the three-position dip switch, wherein the second resistor connected in series between the first pin and the output terminal of the second light source;

a second pin and a sixth pin of the three-position dip switch are connected with a negative pole of the power supply.

6. An electronic device comprising a color mixing apparatus for light sources, wherein the color mixing apparatus for light sources adopts the color mixing method for light sources according to claim 1.

\* \* \* \* \*